United States Patent [19]
Oldham et al.

[11] Patent Number: 5,481,440
[45] Date of Patent: Jan. 2, 1996

[54] CIRCUIT PACK WITH LIGHT PIPES

[75] Inventors: Michael L. Oldham, Boulder; Gerald L. Buxton, Thornton, both of Colo.

[73] Assignee: AT&T Corp., Murray Hill, N.J.

[21] Appl. No.: 173,594

[22] Filed: Dec. 27, 1993

[51] Int. Cl.$^6$ ................................................ F21V 8/00
[52] U.S. Cl. .................... 362/32; 362/234; 362/800; 340/815.45
[58] Field of Search .............................. 362/32, 227, 234, 362/800, 26; 340/461, 815.42, 815.45, 815.47, 815.53, 815.78

[56] References Cited

U.S. PATENT DOCUMENTS

| | | | |
|---|---|---|---|
| 3,667,104 | 6/1972 | Chamillard et al. | 29/203 |
| 3,786,499 | 1/1974 | Jankowski et al. | 340/378 |
| 4,138,672 | 2/1979 | Kepchar | 340/378.1 |
| 4,163,883 | 8/1979 | Boulanger | 362/32 |
| 4,306,716 | 12/1981 | James et al. | 273/1 E |
| 4,367,467 | 1/1983 | Emile, Jr. | 340/765 |
| 4,504,830 | 3/1985 | Boehme | 340/815.42 |
| 4,603,496 | 8/1986 | Latz et al. | 40/547 |
| 4,683,359 | 7/1987 | Wojtanek | 200/314 |
| 4,789,224 | 12/1988 | Bougsty | 350/345 |
| 4,818,829 | 4/1989 | Nopper et al. | 200/512 |
| 4,935,856 | 5/1993 | Dragoon | 362/800 |

FOREIGN PATENT DOCUMENTS

| | | | |
|---|---|---|---|
| 0973521 | 8/1975 | Canada | 340/815.42 |
| 0221370 | 5/1987 | European Pat. Off. | 340/815.45 |

Primary Examiner—Ira C. Lazarus
Assistant Examiner—Y. Quach

[57] ABSTRACT

A circuit pack has a flat circuit board and a flat apertured face plate mounted at substantially right angles to the board. A plurality of light emitting diodes are surface mounted on the board and emit light at an angle to the axis of the apertures in the face plate. Mounted in each of the apertures is a light guiding member, one end of which overlies the corresponding diode and has a reflecting surface positioned in the path of light emitted from the diode to redirect the light through the aperture. Crush ribs on the surface of the light guiding member to aid in affixing it in the aperture.

12 Claims, 3 Drawing Sheets

CIRCUIT PACK WITH LIGHT PIPES

FIELD OF INVENTION

This invention relates to circuit board and face plate assemblies or circuit packs having light emitting diodes, and, more particularly, to such an assembly wherein means are used to redirect the light from the diodes.

BACKGROUND OF THE INVENTION

Circuit packs, which generally comprise a printed circuit board and a plate, are commonly used in large scale circuitry systems such as switching systems, telephone central offices, and the like in the form of plug in modules or cards. The face plate is usually mounted at one end of the board, in a plane at right angles to the board, and has indicators, most often lights, to indicate the operative or maintenance conditions of the board. Thus, when a multiplicity of boards or cards are plugged into a carrier or rack thus forming an array, each of the boards can be monitored by the operator by observing the optical indications on or in the corresponding face plate. The optical indicators are usually in the form of light emitting diodes (LED's) mounted on the boards and connected to the circuitry thereof. In order that the LED's can be observed by observing the face plate, the diode leads are bent at right angles and the LED's are inserted into holes in the face plate. Such an arrangement is adequate for use with "through hole" type circuit boards, where the LED leads are soldered in holes in the board, but the LED's overhang the edges of the board prior to the face plate being mounted thereto. This overhang makes the LED's liable to damage in handling, hence, care must be exercised to protect the overhanging diodes prior to final assembly.

A more efficient and economical circuit board arrangement is the so called "surface mount", wherein the various circuit components, including the LED's, are mounted on the surface of the board, without the necessity of through holes in the board. The surface mount arrangement has numerous advantages, such as a more efficient use of available board space, and the elimination of hand mounting those elements, such as the LED's, having leads that must be threaded into the through holes. In addition, the elements mounted on the board surface, and also other circuit connections, are soldered in place by infra-red heating of the entire board. Thus, the surface mounted arrangement is amenable to an entirely automated process, thereby drastically reducing the member of manual operations involved. Unfortunately, the automated process of soldering surface mount components to the board requires that the LED be able to withstand the high temperatures of the infrared heating. In general, an LED for through hole mounting is encapsulated in an epoxy member through which the leads extend, and which functions as a lens for the diode. Under infra-red heating, it is not uncommon for the encapsulation to flow or move, which tends to bend, severely displace, or even break the leads. Thus, the common, commercially available LED is one of two types; the encapsulated type with leads, which is liable to damage in the infra-red soldering operation, and the surface mount type, which is not encapsulated and which can withstand the infra-red heating without damage. In an automated process, the surface mount type is much to be preferred inasmuch as it can be placed and soldered by machine in a much more economical operation than the mounting of the encapsulated lead type. In addition, the surface mounted LED does not overhang the edge of the circuit board, hence, it is not as likely to be damaged in handling.

The surface mounted LED presents another problem, however, and that is how to transmit its upwardly directed light into or through the face plate for viewing. There have been numerous proposed solutions to this problem, one of which, for example, comprises a right angled light guide and an LED encapsulated in a plastic housing. The housing, however, prevents or inhibits repair or replacement or a faulty LED, it being necessary to replace the entire assembly when replacing a faulty diode.

SUMMARY OF THE INVENTION

The present invention is a card and light pipe arrangement for re-directing the light from a surface mounted LED positioned on the board through an opening in the right angle oriented face plate without the light pipe being mounted on, encapsulated with, or otherwise in contact with the surface mounted LED.

In a preferred embodiment of the invention a plurality of light pipes of a suitable transparent light conducting plastic material are mounted on a connecting runner or runners which maintain the light pipes in fixed, spaced relationship. The spacing of the light pipes is substantially identical to the spacing of the surface mounted LED's on the circuit board, and the face plate has a plurality of holes drilled therethrough which are spaced the same.

Each individual light pipe comprises a substantially cylindrically transparent member of a light conducting material such as acrylonitrile butadiene styrene (ABS) or a polycarbonate such as Lexan®, which has excellent heat resistance properties. At one end of the cylindrical member a flat is formed which, when the light pipe assembly is in place, overlies the light emitting face of the corresponding LED. Directly opposite the flat on the other side of the longitudinal axis of the cylindrical member is an angular face, preferably at forty-five degrees (45°) to the axis, which has a polished surface. A plurality of crush ribs, circumferentially spaced about the cylinder, extend longitudinally from the opposite end of the cylindrical member toward the center thereof. When the light pipe is fitted within its corresponding hole in the face plate, the ribs are deformed or "crushed" and function to hold the light pipe timely in the hole. When the entire light pipe assembly is thus mounted at the rear of the face plate, the connecting runner bears against the rear surface of the face plate and is fixed in this position by the cumulative action of the crush ribs on the several light pipes.

Extending along the rear of the face plate is a longitudinal slot which receives the edge of the circuit board, and fastening means are provided for affixing the face plate to the circuit board. The spacing of the slot from the holes in the face plate is such that, when plate and board are assembled and fixed, the flat portions of the light pipes overlie the light emitting surfaces of the LED's and are spaced therefrom by an extremely small gap such as, for example, one half of one thousandth of an inch (0.0005"), although the gap can be greater. From an operative standpoint, the flat can be in contact with the LED face, but from an assembly standpoint, the gap is to be preferred.

The light pipes and the connecting runner are injection molded or otherwise formed together as a single piece, and the runner is provided with U-shaped notches between each of the cylindrical light pipes to facilitate breaking the connecting runner to reduce the number of light pipes, where necessary. Thus, if the circuit board has, for example, three LED's, and the injection molded light pipe-runner assembly has six light pipes, the runner can be broken in half at the proper notch to make an assembly of three light pipes and connecting runner.

When the entire assembly is in operation, light emitted by an LED is directed against the angled surface of the light pipe and is interiorly reflected thereby at an angle of ninety degrees (90°) to its original direction, and is directed axially along the light pipe to the end thereof mounted in the face plate, frown where it can be observed.

These and other features and principles of the present invention will be more readily apparent from the following detailed description, read in conjunction with the accompanying drawings.

DETAILED DESCRIPTION

Figure 1:
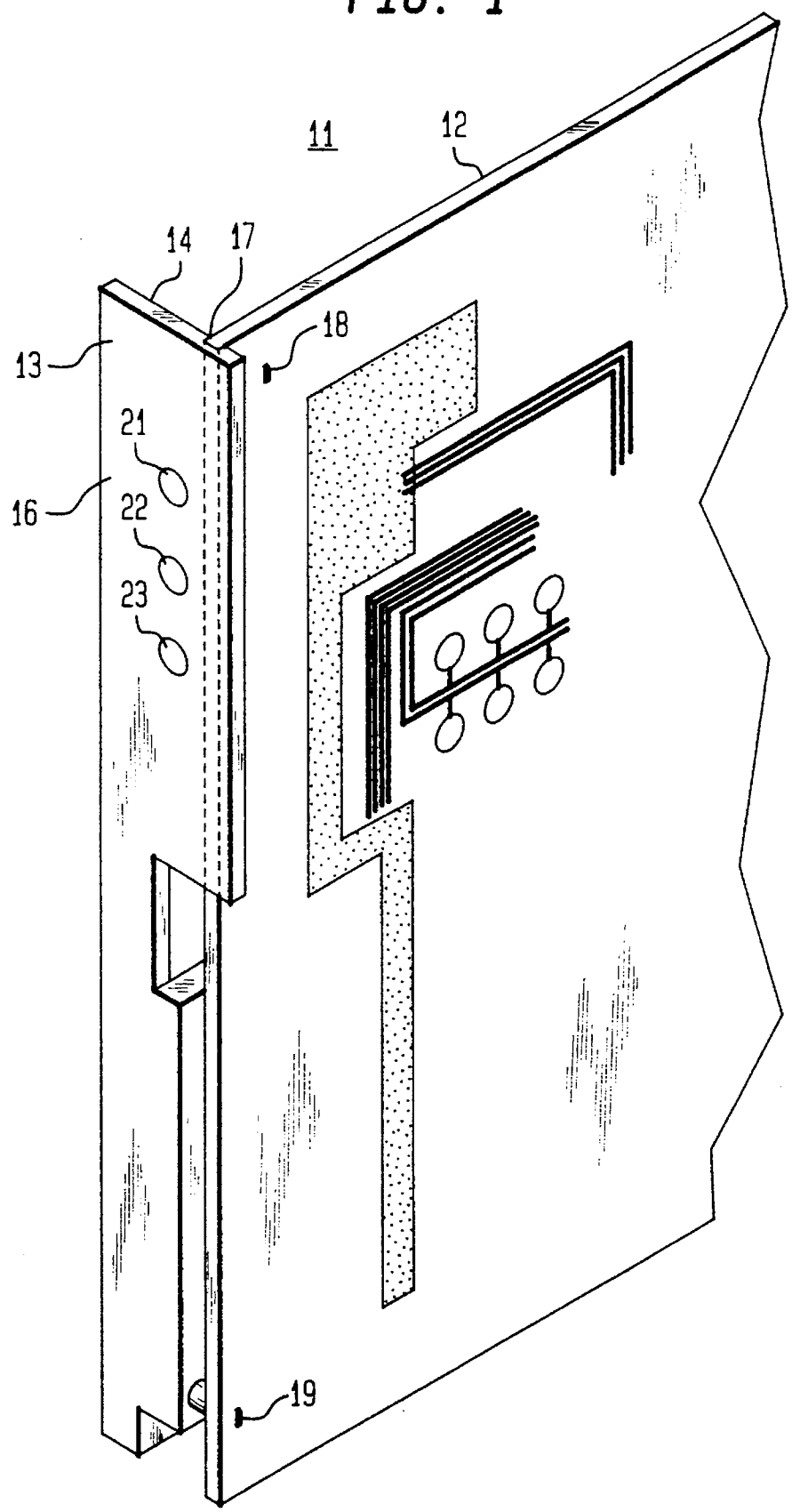
FIG. 1 is a perspective view of a portion of a printed circuit board with a face plate mounted thereon.

FIG. 1 depicts a portion of a card 11 comprising a circuit board 12 of the surface mount type and a face plate 13 having a rear surface 14 and a front surface 16. Formed in the rear surface 14 of face plate 13 is a longitudinally extending slot 17 into which one end of board 12 is inserted and maintained, by suitable fastening means 18 and 19, in a plane normal to the plane of rear surface 14 and hence face plate 13. Face plate 13 has a plurality of holes 21, 22 and 23 extending therethrough for observing the operative or maintenance condition of the card as indicated by LED's, not shown. It is to be understood that the card 11 of FIG. 1 represents a preferred embodiment of the invention, to be discussed more fully hereinafter, but it is not intended that the various features of the invention be limited to the particular configuration shown in FIG. 1.

Figure 2:
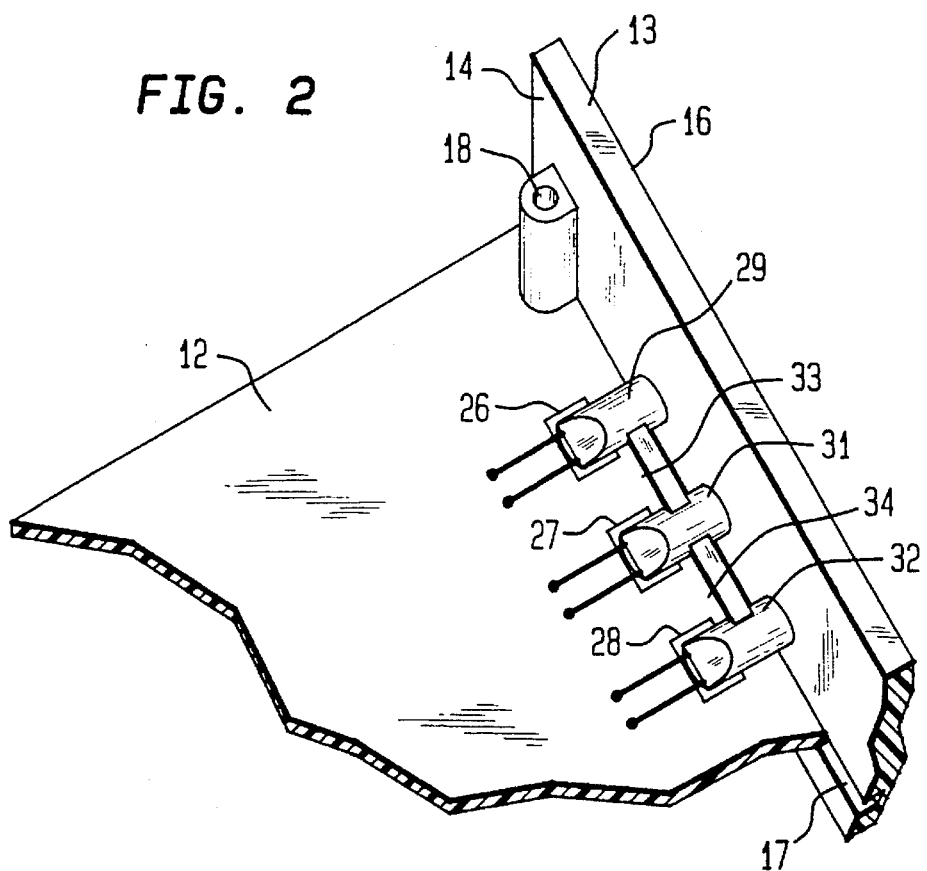
FIG. 2 is a perspective view of the board and face plate of FIG. 1, from the top side, showing the light pipe arrangement of the present invention.

FIG. 2 depicts a portion of the rear side of face plate 13 and the top surface of circuit board 12. For purposes of illustration, circuit board 12 is shown as having three LED's 26, 27 and 28 surface mounted thereon. Overlying the diodes are light pipe members, 29, 31 and 32, which are connected together by connecting runners 33 and 34, and which extend into holes 21, 22 and 23 respectively in face plate 13. As will be more apparent hereinafter, runners 33 and 34 bear against rear surface 14 of face plate 13 when the assembly is complete, thereby fixing light guides 29, 31 and 32 longitudinally with respect to the diodes 26, 27 and 28, respectively.

Figure 3:
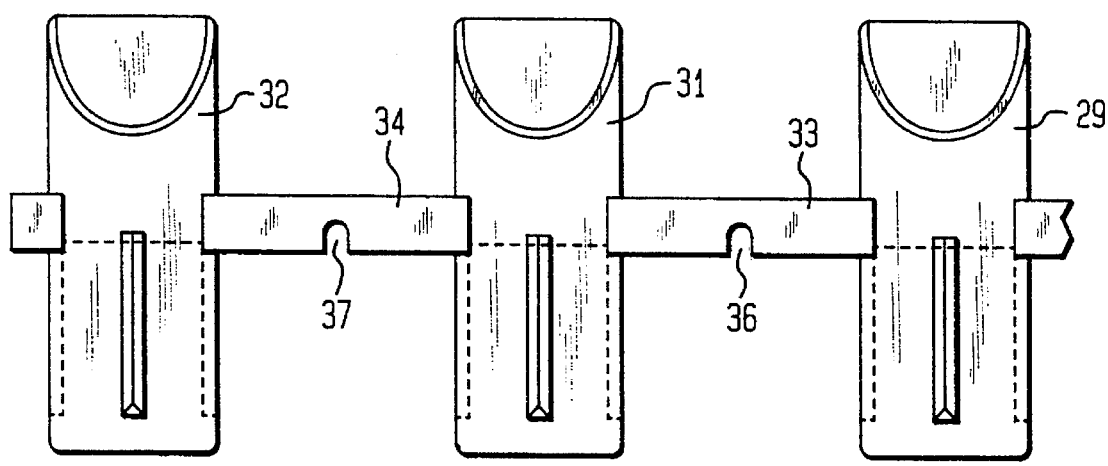
FIG. 3 is a plan view of the multiple light pipe and connecting runner array of the invention as formed, as by injection molding.

In FIG. 3 there is shown in more detail tile light pipe assembly of FIG. 2 wherein the light pipes 29, 31 and 32 are connected by the runner or connectors 33 and 34, the assembly having been injection molded, for example, of a suitable transparent light guiding material such as acrylonitrile butadiene styrene (ABS) or a polycarbonate such as Lexan®. There are numerous plastic materials which possess the desired light guiding characteristics, and the aforementioned materials are by way of example only. As will be more apparent hereinafter, each of the light pipes 29, 31 and 32 is cylindrical in shape, and the connecting runners 33 and 34 are preferably, although not necessarily, rectangular in shape. The molded structure shown in FIG. 3 comprises three light pipes, but it is possible, even preferable, that a larger number, such as six or eight, light pipes and connectors are molded at a time, and when a lesser number of light pipes is desired, the runner is broken in the proper place to produce an assembly of the desired number of light pipes. To this end, the runners or connectors each have a U-shaped or a V-shaped notch, such as at 36 and 37 located approximately mid-way between adjacent light pipes to facilitate breakage of the connector at the desired location.

Figure 4A:
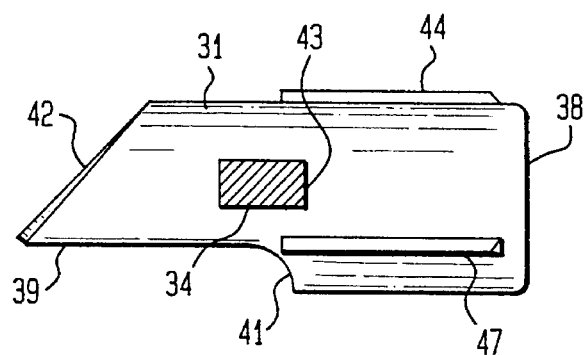
FIG. 4A is a side view of a light pipe as used in the present invention.
Figure 4B:
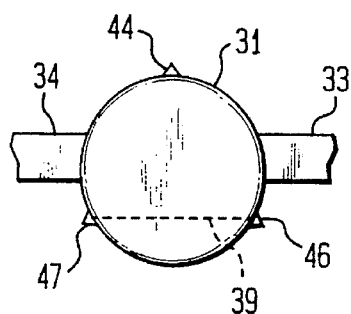
FIG. 4B is an end view of the light pipe of FIG. 4A.

FIGS. 4A and 4B depict a single light pipe such as pipe 31, which is representative of all such light pipes of tile invention. Pipe 31 is a cylindrical member having a front face 38 which is preferably flat, but which may be convex in shape to function as a light focusing lens. At the rear of pipe 31, on the lower portion thereof, is a flat surface 39 formed by an undercut 41. Above the flat surface 39 and on the other side of the longitudinal therefrom is an angled surface 42, at an angle of forty-five degrees (45°) to the longitudinal axis and to the plane of flat surface 39. Surface 42 is preferably polished and is beveled or chamfered around its periphery, as shown. Connecting runners 33 and 34 are formed integrally with pipe 31 and am located approximately at the longitudinal midpoint of pipe 31, as shown. FIG. 2, the front surface 43 of connecting runners 33 and 34, as well as the other connecting runners, is adapted to bear against rear surface 14 of the face plate 13 when the light pipes are in place. Located around the periphery of pipe 31 are spaced, longitudinally extending crush ribs 44, 46 and 47, which, as shown, are preferable, but not necessarily, triangular in shape and which extend from the front portion of pipe 31 toward the rear thereof for approximately half its length. The front end of each of the ribs 44, 46 and 47 is beveled, as shown, to facilitate insertion of light pipe 31 into its corresponding face plate hole 22.

Figure 5:
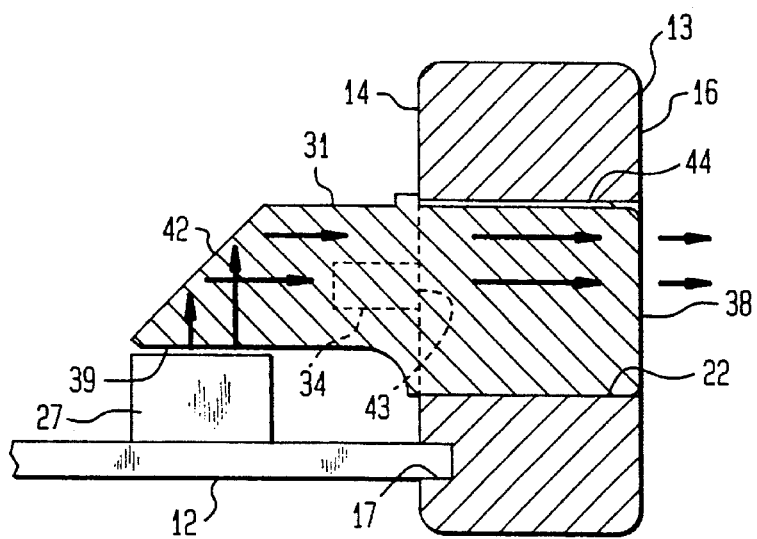
FIG. 5 is a cross-sectional elevation view of the light pipe, face plate, and board assembly of the present invention.

FIG. 5 depicts a light pipe, such as light pipe 31, as inserted into the proper face plate hole 22 in face plate 13. As can be seen, crush rib 44 is deformed, in effect "crushed", by insertion into the hole, and, along with ribs 46 and 47, function to fix pipe 31 firmly in place within hole 22. The spacing of surface 43 of connecting runner 34 from front surface 38 is such that when surface 43 bears against surface 14, surface 38 is substantially flush with surface 16 of face plate 13. This is the preferred configuration, but the principal criterion is that the front surface of the light pipe be clearly visible from in front of the face plate. Flat surface 39 overlies the top of the LED 27, and is preferably spaced therefrom, as shown. As pointed out hereinbefore, surface 39 can actually be in contact with the top, light emitting, face of diode 27, but in such a case, greater care is required in assembling the unit to prevent damage to either the diode, the light pipe, or both. In practice, the spacing or gap between surface 39 and the top surface of the LED is approximately 0.0005" or slightly more.

With the light pipe positioned as shown in FIG. 5, light emitted from the top of the LED enters pipe 31 in a vertical direction as shown by the arrows in FIG. 5 until it is reflected off of the interior face of surface 42 after which it travels longitudinally through pipe 31 and over surface 38, also as shown by the arrows, thus being clearly visible to an observer looking at face plate surface 16.

The card and light pipe assembly of the present invention, as described in detail in the foregoing, makes possible the advantageous use of surface mounted diodes and the observation of the light emitted from the diodes in a direction at an angle, e.g., ninety degrees (90°), from the direction of emission of the light by the diodes. In addition, the entire assembly of the card, including the face plate and the light pipes, is amenable to automated production techniques, with a consequent economic benefit. It is to be understood that although a preferred embodiment of the invention and its principals and features has been shown, numerous variations and changes in the physical structure may occur to workers in the art without departure from these principals and features.

We claim:

1. A circuit pack comprising:

a face plate member having at least one aperture therein, a planar printed circuit board having at least one light emitting device thereon corresponding to said one aperture of said face plate member and said light emitting device adapted to emit light at an angle to a plane of said circuit board, said circuit board being mounted at one end thereof to said face plate member at an angle thereto;

means for redirecting the light emitted by said device into said corresponding one aperture in said face plate member, said means comprising a light pipe member overlying said device and mounted in said corresponding aperture, said light pipe member having means therein for reflecting the light emitted from said one device at an angle to the direction of light emission into said corresponding one aperture in said face plate member;

said light pipe member having a first end region in said corresponding one aperture in said face plate member and a second end region having a flat surface thereon overlying a light emitting surface of said device; and means on said first end region of said light pipe member for affixing said member in said corresponding one aperture.

2. A circuit pack as claimed in claim 1 wherein said means for reflecting the light comprises an angular surface on said light pipe member positioned in the path of the light emitted from the device.

3. A circuit pack as claimed in claim 2 wherein said light pipe member is cylindrical in shape with a longitudinal axis substantially parallel to the plane of said circuit board, said light pipe member being mounted in said corresponding one aperture in said face plate member.

4. A circuit pack as claimed in claim 3 wherein said angular surface is located on said second end region opposite said flat surface at least partially on the opposite side of the longitudinal axis from said flat surface.

5. A circuit pack comprising:

a substantially planar face plate member having a plurality of spaced apertures therein;

a planar printed circuit board having a plurality of spaced light emitting diodes mounted thereon, the spacing of said diodes being the same as the spacing of said apertures, means for mounting said face plate member to said circuit board with its plane substantially at right angles to a plane of said circuit board with each of said apertures adjacent a corresponding one of said diodes;

a plurality of spaced light transmission members extending from said apertures toward said diodes, each light transmission member extending from one of said apertures toward one of said diodes with each light transmission member overlying a light emitting surface of a corresponding diode;

means for maintaining said plurality of light transmission members in spaced relationship relative to each other and in fixed longitudinal relationship relative to said diodes;

each one of said plurality of light transmission members having reflecting means for directing the light emitted by its corresponding diode into the corresponding aperture; and each one of said plurality of light transmission members extends into the correspondence aperture and has retaining means thereon for retaining it in said aperture, said retaining means comprising at least one crush rib extending longitudinally of said light transmission member for a portion of its length.

6. A circuit pack as claimed in claim 5 wherein each of said light transmission members has a longitudinal axis and said reflecting means comprises an angled surface positioned in the path of light emitted from the corresponding diode.

7. A circuit pack as claimed in claim 6 wherein said angled surface is at a forty-five degree angle relative to said longitudinal axis.

8. A circuit pack as claimed in claim 6 wherein each of said light transmission members has a flat surface overlying the light emitting surface of the corresponding diode and spaced therefrom.

9. For use in a circuit pack having a face plate having front and rear surfaces and a plurality of apertures therein, each of said apertures having an axis spaced from the respective axes of adjacent apertures and a circuit board mounted to the rear surface of the face plate and having a plurality of spaced surface mounted light emitting diodes thereon wherein each of the diodes is spatially separated from a corresponding adjacent aperture and is adapted to emit light in a direction at an angle to the axis of the aperture;

a light transmission member for directing light emitted from a diode into and through its corresponding adjacent aperture, said light transmission member comprising;

an elongated cylindrical member of light guiding material and having a longitudinal axis, said member having a first end region adapted to be inserted in the corresponding aperture and a second end region adapted to overlie the diode;

light redirecting means on said second end region for redirecting light emitted from the diode in a direction which is at an angle to said longitudinal axis to a direction along said longitudinal axis; and means on said first end region for securing said first end region in the corresponding aperture.

10. A light transmission member as claimed in claim 9 wherein said second end region has a flat surface thereon adapted to overlie the light emitting surface of the diode.

11. A light transmission member as claimed in claim 9 wherein said light redirecting means comprises an angled reflecting surface on said cylindrical member adapted to reflect light emitted from the diode at an angle of approximately ninety degrees.

12. For use in a circuit pack having a face plate having a plurality of spaced apertures therein and a circuit board mounted to a rear of the face plate and having a plurality of spaced surface mounted light emitting diodes thereon wherein each of the diodes is located adjacent one aperture and is adapted to emit light in a direction at an angle to an axis of the aperture;

a light transmission member for directing light emitted from a diode into and through its corresponding adjacent aperture, said light transmission member comprising;

an elongated cylindrical member of light guiding material and having a longitudinal axis, said member having a first end region adapted to be inserted in the corresponding aperture and a second end region adapted to overlie the diode;

light redirecting means on said second end region for redirecting light emitted from the diode in a direction at an angle to said longitudinal axis to a direction along said longitudinal axis: and means on said first end region for securing said first end region in the corresponding aperture comprising at least one crush rib extending along said cylindrical member from the first end region toward said second end region.

\* \* \* \* \*